United States Patent
Hoyt et al.

(10) Patent No.: US 10,326,287 B2
(45) Date of Patent: Jun. 18, 2019

(54) MULTIPLE BATTERY CELL MONITOR HAVING SHARED CONTROL LINES AND BALANCE SWITCH

(71) Applicant: Apple Inc., Cupertino, CA (US)

(72) Inventors: Robert J. Hoyt, Sunnyvale, CA (US); Todd D. Heathershaw, San Jose, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 15/650,891

(22) Filed: Jul. 15, 2017

(65) Prior Publication Data

US 2018/0278065 A1   Sep. 27, 2018

Related U.S. Application Data

(60) Provisional application No. 62/477,112, filed on Mar. 27, 2017.

(51) Int. Cl.
*H02J 7/00* (2006.01)

(52) U.S. Cl.
CPC .......... *H02J 7/0021* (2013.01); *H02J 7/0019* (2013.01); *H02J 7/0022* (2013.01); *H02J 7/0024* (2013.01); *H02J 7/0026* (2013.01)

(58) Field of Classification Search
CPC ...... H02J 7/0021; H02J 7/0019; H02J 7/0024; H02J 7/0026; H02J 7/0022

USPC ......................................................... 320/119
See application file for complete search history.

(56) References Cited

U.S. PATENT DOCUMENTS

| | | | |
|---|---|---|---|
| 9,007,025 B2* | 4/2015 | Miller et al. .......... | H02J 7/0018 320/112 |
| 9,673,640 B2* | 6/2017 | Kudo et al. .......... | H02J 7/0016 |
| 2016/0261127 A1* | 9/2016 | Worry et al. ...... | G01R 31/3624 |
| 2018/0254641 A1* | 9/2018 | Kadirvel et al. ...... | H02J 7/0026 |

\* cited by examiner

*Primary Examiner* — Sun J Lin
(74) *Attorney, Agent, or Firm* — Kilpatrick Townsend & Stockton, LLP (57) ABSTRACT

Battery systems that can monitor and control multiple battery cells in electronic devices. One embodiment provides a battery system having multiple battery cells controlled by a single battery controller. Each battery cell is connected to a first end of a control path, a second end of the control path is connected to either a positive terminal or a negative terminal of the battery system. Each control path includes a charge control transistor that allows or prevents charging of a battery cell, a discharge control transistor that allows or prevents discharging of a battery cell, and a current sense resistor to sense currents into or out of a battery cell. The charge control transistor and the discharge control transistor can be controlled by control outputs provided by the battery controller. The battery controller also includes a balance switch to provide a low-impedance path between battery cells to reduce offset voltages between them.

20 Claims, 8 Drawing Sheets

MULTIPLE BATTERY CELL MONITOR HAVING SHARED CONTROL LINES AND BALANCE SWITCH

CROSS-REFERENCE TO RELATED APPLICATIONS

This application claims the benefit of U.S. provisional application No. 62/477,112, filed Mar. 27, 2017, which is incorporated by reference.

BACKGROUND

Battery-powered electronic devices have become a ubiquitous staple of life. Electronic devices, such as smart phones, tablets, laptops, flashlights, keyboards, mice, headphones, and other portable devices are used on a regular basis, and as a result, need to be charged regularly. An attendant result is a demand by users for longer battery life in these devices.

A battery may run into various non-optimal conditions during operation. For example, a battery may be charged to a voltage that is near or above a safe operating condition. Such an over-voltage condition may necessitate the disabling of a charging path for the battery. To accomplish this, battery systems may incorporate a battery controller. The battery controller may include control circuitry that may prevent further charging in such an over-voltage condition. These controllers may provide safety and increase an overall useful life of a battery.

These electronic devices are also becoming smaller. This reduction in form places a premium on space inside these devices. The need to optimally locate and position each component in an electronic device becomes paramount.

In some circumstances, the space inside an electronic device that is available for a battery is not optimal for a single battery. This may be caused by the available space being non-contiguous. It may instead be caused by the available space not easily corresponding to the space consumed by a commercially available battery. For these and other reasons, multiple battery cells may be used in an electronic device.

In an electronic device that may include multiple battery cells, it may particularly be desirable to include a battery controller and related circuitry to prevent or recover from non-optimal conditions, such as the over-voltage conditioned described above.

Thus, what is needed are battery systems that may monitor and control multiple battery cells in electronic devices.

SUMMARY

Accordingly, embodiments of the present invention may provide battery systems that may monitor and control multiple battery cells in electronic devices. An illustrative embodiment of the present invention may provide a battery system having multiple battery cells controlled by a single battery controller. The battery cells may have different capacities, form factors, resistances, or other characteristic or combination thereof. Each battery cell may be connected to a first end of a control path, the second end of which may be connected to either a positive or negative terminal of the battery system. Each control path may include a charge control transistor that may allow or prevent charging of a battery cell, a discharge control transistor that may allow or prevent discharging of a battery cell, and a current sense resistor to sense a charging or discharging current into or out of a battery cell. The charge and discharge control transistors may be under the control of charge and discharge control outputs provided by the battery controller. The charge control transistors in each control path may have control electrodes, such as a gate, that are connected to each other and to the charge control output of the battery controller. The discharge control transistors in each control path may have control electrodes, such as a gate, that are connected to each other and to the discharge control output of the battery controller.

In these and other embodiments of the present invention, a battery controller may measure the voltage and current for each battery cell to determine whether an over-voltage or over-current condition exists. This determination may be made by comparing a voltage or current to a limit, where the limits may be the same or different for each battery cell. If such a condition exits, the charge control output of the battery controller may change state, thereby turning off each of the charge control transistors and preventing further charging of each of the battery cells. Each of the charge control transistors may be oriented in such a way that their body diodes provide a discharge path through the battery cells when charging is disabled.

In these and other embodiments of the present invention, a battery controller may measure the voltage and current for each battery cell to determine whether an under voltage or under current condition exists. This determination may be made by comparing a voltage or current to a limit, where the limits may be the same or different for each battery cell. If such a condition exits, the discharge control output of the battery controller may change state, thereby turning off each of the discharge control transistors and preventing further discharging of each of the battery cells. Each of the discharge control transistors may be oriented in such a way that their body diodes provide a charge path through the battery cells when discharging is disabled.

These and other embodiments of the present invention may further include temperature sensors. These temperature sensors may be placed on or near the battery cells or other battery system components. These temperature sensors may detect excessive temperatures (either high or low, or both) and prevent further charging, discharging, or both of their corresponding battery cells until temperatures return to an acceptable range.

These and other embodiments of the present invention may further include pressure sensors. These pressure sensors may be placed on or near the battery cells or other battery system components. These pressure sensors may detect an increase in pressure in a battery cell and prevent further charging, discharging, or both, of their corresponding battery cells. These and other embodiments of the present invention may further include other types of sensors. These sensors may detect an event or condition and prevent further charging, discharging, or both, of their corresponding battery cell or cells.

In these and other embodiments of the present invention, the control electrodes of the charge control transistors may be connected together, and the control electrodes of the discharge control transistors may be connected together. This may prevent large voltage differences between battery cells in a device from occurring.

For example, the discharge control transistors may be controlled separately. If an under-voltage condition for a first battery in such a system occurs, a discharge control transistor for the first battery may be turned off to prevent discharging, though a discharge control transistor for the second battery may remain on. If both cells are then charged, the body diode of the discharge control transistor for the first battery may turn on to approximately 0.7 Volts. This may limit the charge voltage of the first battery to be a diode drop (0.7 Volts) less than the charge voltage of the second battery. When the under-voltage condition is exited and the discharge control transistor in the control path for the first battery turned on, the control paths would provide a connection between the batteries. That would result in the 0.7 volts being applied across the resistance of the control paths and any parasitic resistances in the connection paths. Since these resistances are typically small, the resulting currents may be large and may damage the battery system circuitry or its interconnect. By connecting the control electrodes of the charge control transistors together, and further connecting the control electrodes of the discharge control transistors together, the likelihood of large voltage differences occurring between battery cells may be reduced.

Unfortunately, voltage differences between battery cells may still occur. For example, in an over-current discharge condition, battery cells may discharge at different rates due to differences in their capacities, thereby leading to a difference in battery cell voltages. Similarly, in an over-current charge condition, battery cells may charge at different rates due to differences in their capacities, thereby leading to a difference in battery cell voltages. As another example, one battery cell may leak more than another when the device is powered off, causing that battery cell to have a comparatively reduced voltage over time. When the device is activated, the battery cells may be connected through the control paths. The difference in battery cell voltages may appear across the control paths, again resulting in large and possibly damaging currents.

Accordingly, these and other embodiments of the present invention may provide a battery controller having a balance switch to balance the voltages between two or more battery cells. These and other embodiments of the present invention may provide a switch portion of the balance switch that may be coupled between terminals of different battery cells. The switch may close when either the charge or discharge control transistors are off and a difference between battery cell voltages is above a threshold voltage. That is, the switch may close when either the charge or discharge control transistors are off because when they are both on, the control paths already provide a low-impedance path between batteries, and the switch may close when the difference between battery cell voltages is above a threshold because otherwise there may not be enough voltage to cause a problem.

In these and other embodiments of the present invention, voltage differences between battery cells may occur due to a short circuit in one of the battery cells, or other such condition. When a relatively large voltage difference is detected between the battery cells, the battery controller may shut off the charge control transistor and discharge control transistor for each of the battery cells. The battery controller may shut off the balance switch as well. The voltage difference at which this occurs may be approximately 0.5 Volts, 0.7 Volts, 1.0 Volts, 1.23 Volts, or other appropriate voltage. In these and other embodiments of the present invention, a timer or other circuit or code may be used such that voltage transients are ignored and the battery controller does not disable the charge and discharge control transistors and balance switch unless the required voltage difference is maintained for a first duration.

Unfortunately, this disabling may cause a difficulty during assembly. For example, during assembly, the battery cells may be attached sequentially, such that one battery cell may be attached before another. In this state, the battery controller may see a large voltage at the attached battery cell and a low voltage due to the unattached battery cell. This voltage difference may be cause the battery controller to disable the charge and discharge control transistors and balance switch. To avoid this, a latch circuit may be employed. The latch circuit may be set only when all the battery cells are attached. Until the latch circuit is set, the battery controller may ignore large voltage differences between the battery cells, such as the difference that may be caused by one battery cell not yet being installed. Once both battery cells are attached, the latch may be set and the battery controller may then react to large voltage differences between the battery cells by disabling the charge and discharge control transistors and balance switch. The latch may be cleared by various conditions, such as the battery cells returning to approximately the same voltage, or when a battery cell is replaced. This latch circuit may be implemented in hardware, software, or a combination thereof. This latch circuit may be at least partially implemented in the battery controller or elsewhere in the system.

In these and other embodiments of the present invention, the switch may be a transistor, a series of two or more transistors, parallel transistors of different types (for example, one N-channel and one P-channel transistor), a relay, a microelectromechanical switch, or other type of switch. The switch may be formed on an integrated circuit with the battery controller, or it may be located off a chip on which the battery controller is formed. The switch may be driven by various types of circuitry that may make up a remainder of the balance switch. For example, the switch may be driven by a window comparator that determines whether an absolute value of a difference between battery cell voltages is above a first voltage threshold. The window comparator may be enabled by a gate that determines that either charging or discharging has been disabled.

Embodiments of the present invention may provide battery systems that may be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, remote control devices, chargers, and other devices that have been developed, are being developed, or will be developed in the future.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
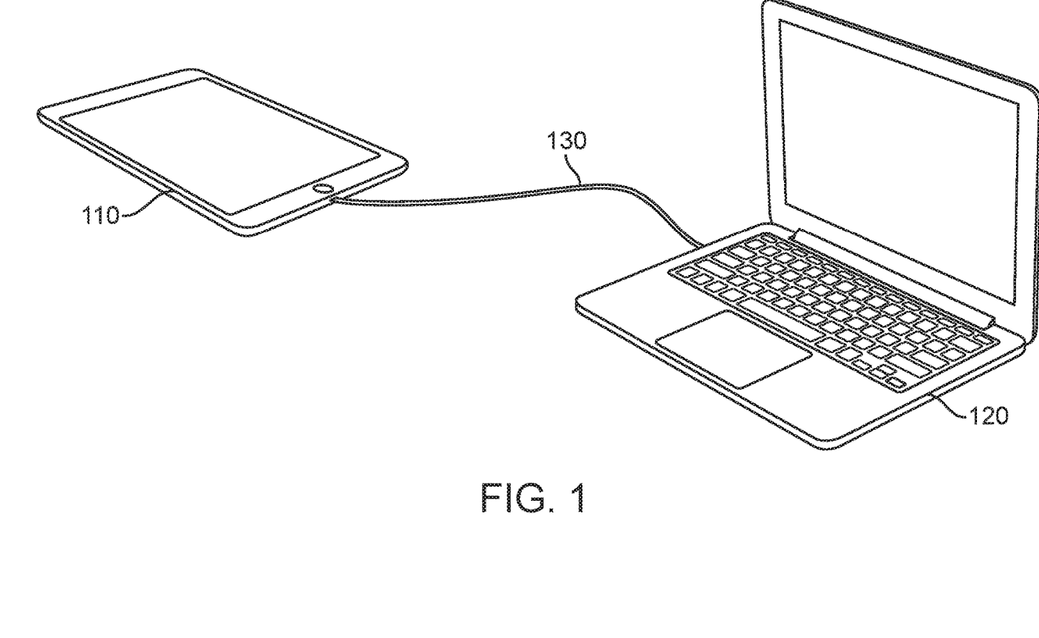
FIG. 1 illustrates an electronic system that may be improved by the incorporation of embodiments of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This figure includes portable computing devices 110 and 120. Portable computing device 110 may be a tablet, smart phone, or other type of portable computing device. Portable computing device 120 may be a laptop, notebook, tablet, or other type of portable computing device. In this example, portable computing device 120 may provide power over cable 130 to portable computing device 110. Portable computer device 110 and portable computing device 120 may share data over cable 130. In these and other embodiments of the present invention, portable computing device 110 and portable computing device 120 may be other types of devices such as desktop computers, laptops, all-in-one computers, wearable computing devices, cell phones, smart phones, media phones, storage devices, portable media players, navigation systems, monitors, power supplies, video delivery systems, remote control devices, chargers, and other devices that have been developed, are being developed, or will be developed in the future.

Portable computing device 110 may receive power over cable 130 from portable computing device 120 or other power source, such as an adapter. Portable computing device 110 may be arranged to have a desirable form factor. For example, portable computing device 110 may be relatively thin. Such a desired form factor may place a premium on space inside portable computing device 110. As a result, battery power for portable computing device 110 may be provided by two or more individual battery cells.

Again, these battery cells may be exposed to over-voltage, over-current conditions, and over discharge conditions. Accordingly, portable computing device 110 may employ a battery controller and related circuitry to protect the battery cells from damage and to increase their usable lifetimes. An example of a battery system comprising multiple battery cells and a single battery controller is shown in the following figure.

Figure 2:
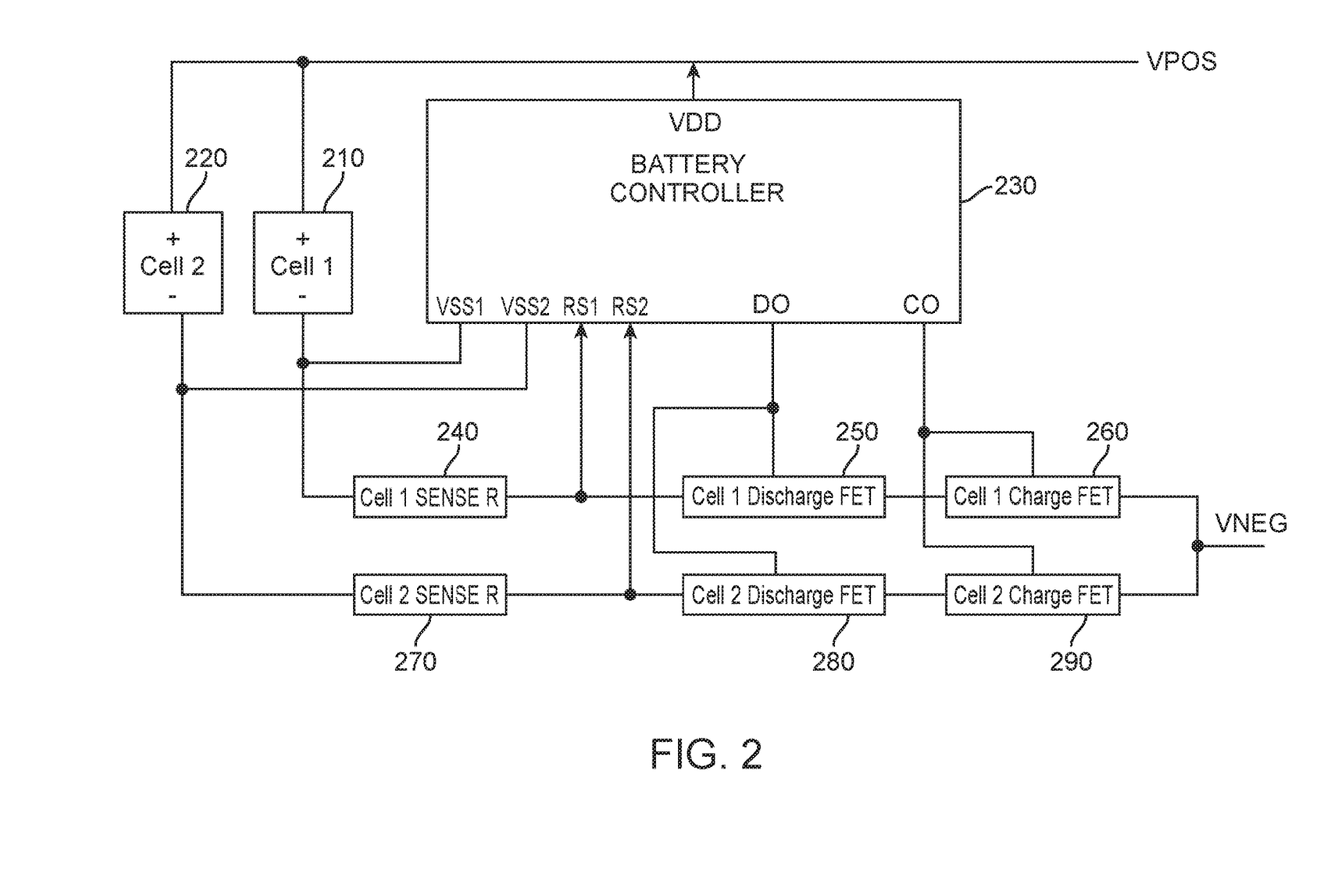
FIG. 2 illustrates a battery system according to an embodiment of the present invention.

FIG. 2 illustrates a battery system according to an embodiment of the present invention. This battery system may include first battery cell 210, second battery cell 220, and battery controller 230. Battery cells 210 and 220 may have different capacities, form factors, resistances, or other characteristic or combination thereof. Each battery cell 210 and 220 may be connected to a control path, the other end of which may be connected to a terminal of the battery system. Each control path may be monitored by, and under the control of, battery controller 230.

Specifically, first battery cell 210 may have a positive terminal connected to a positive terminal of second battery cell 220. These positive terminals may connect to a power supply terminal VDD of battery controller 230 and to the positive or VPOS terminal of the battery system. The negative terminal of the first battery cell 210 may connect to a first sense resistor 240 in a first control path. First sense resistor 240 may further connect to a discharge control transistor 250, which may connect to charge control transistor 260, thereby forming a first control path. The negative terminal of the second battery cell 220 may connect to a second sense resistor 270 in the second control path. Second sense resistor 270 may further connect to a discharge control transistor 280, which may connect to charge control transistor 290, thereby forming a second control path. Charge control transistor 260 and charge control transistor 290 may each couple to the negative or VNEG terminal of the battery system.

The positive terminals of first battery cell 210 and second battery cell 220 may connect together and be received by battery controller 230 at its VDD terminal. The negative terminals of first battery cell 210 may connect to the VSS1 terminal of battery controller 230, while the negative terminal of second battery cell 220 may connect to the VSS2 terminal of battery controller 230. In this way, battery controller 230 may monitor the individual voltages across first battery cell 210 and second battery cell 220 simultaneously and independently. First sense resistor 240 may be coupled between terminals VSS1 and RS1 of battery controller 230. Similarly, second sense resistor 270 may be coupled between terminals VSS2 and RS2 of battery controller 230. In this way, battery controller 230 may monitor charge and discharge currents in an out of first battery cell 210 and second battery cell 220 simultaneously and independently.

In this configuration, battery controller 230 may determine when either the first battery cell 210 or second battery cell 220 is discharged below a voltage threshold. Battery controller 230 may also determine when a discharge current is above a current threshold. More specifically, battery controller 230 may measure a voltage across first sense resistor 240 and second sense resistor 270. Since the values of these resistors are known, the discharge currents may be determined. In these and other embodiments of the present invention, when a discharge current exceeds a first current threshold for a first short period of time, battery controller 230 may determine that an excess discharge current has been drawn. In these and other embodiments of the present invention, when a discharge current exceeds a second, lower current threshold but for a longer, second period of time, battery controller 230 may similarly determine that an excess discharge current has been drawn. Battery controller 230 may further detect other various excessive discharge current conditions.

When battery controller 230 detects either that first battery cell 210 or second battery cell 220 has been discharged below the threshold voltage, or that a discharge current out of either first battery cell 210 or second battery cell 220 is excessive, battery controller 230 may de-assert the DO output (take it low to a logic "0"), thereby turning off first discharge control transistor 250 and second discharge control transistor 280. Turning off these discharge control transistors 250 and 280 may prevent further discharging of both first battery cell 210 and second battery cell 220.

Similarly, in this configuration, battery controller 230 may determine when either the first battery cell 210 or second battery cell 220 is charged above a voltage threshold. Battery controller 230 may also determine when a charge current is above a current threshold. More specifically, battery controller 230 may measure a voltage across the first sense resistor 240 and second sense resistor 270. Since these resistors are known, the charge currents may be determined. In these and other embodiments of the present invention, when a charge current exceeds a first current threshold for a first short period of time, battery controller 230 may determine that an excess charge current has been provided. In these and other embodiments of the present invention, when a charge current exceeds a second, lower current threshold but for a longer, second period of time, battery controller 230 may similarly determine that an excess charge current has been provided. Battery controller 230 may further detect other various excessive charge current conditions.

When battery controller 230 detects either that first battery cell 210 or second battery cell 220 has been charged above a threshold voltage, or that a charge current into either first battery cell 210 or second battery cell 220 is excessive, battery controller 230 may de-assert the CO output (take it low to a logic "0"), thereby turning off first charge control transistor 260 and second charge control transistor 290. Turning off these charge control transistors 260 and 290 may prevent further charging of both first battery cell 210 and second battery cell 220.

First discharge control transistor 250 and second discharge control transistor 280, as well as first charge control transistor 260 and second charge control transistor 290, may each include body diodes. These body diodes may be oriented such that charge paths are provided even though the discharge control transistors 250 and 280 are off, and discharge paths are provided even though the charge control transistors 260 and 290 are off. An example is shown in the following figure.

Figure 3:
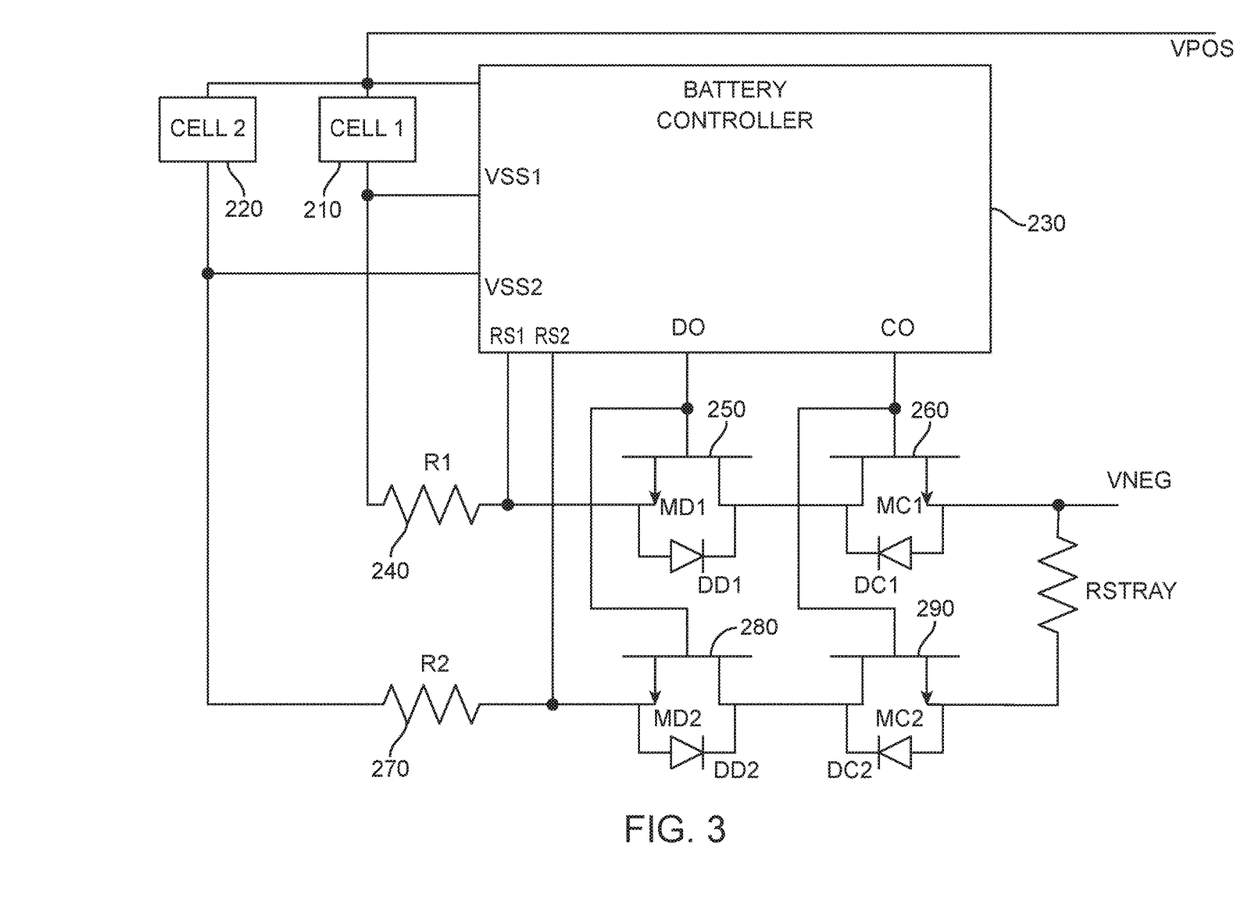
FIG. 3 illustrates a more detailed view of a battery system according to an embodiment of the present invention.

FIG. 3 illustrates a more detailed view of a battery system according to an embodiment of the present invention. In this example, discharge control transistors 250 and 280 are shown in more detail as transistors MD1 and MD2 and their corresponding body diodes DD1 and DD2. Similarly, charge control transistors 260 and 290 are shown in more detail transistors MC1 and MC2 and their corresponding body diodes DC1 and DC2.

With the body diodes in this configuration, when discharge control transistors 250 and 280 are off, charge current may still flow through their body diodes DD1 and DD2. Similarly, when charge control transistors 260 and 290 are off, discharge current may still flow through their body diodes DC1 and DC2.

In these and other embodiments of the present invention, control electrodes or gates of charge control transistors 260 and 290 may be connected together, and the control electrodes or gates of the discharge control transistors 250 and 280 may be connected together. This may prevent large voltage differences between battery cells in a device from occurring.

As an example, discharge control transistors 250 and 280 may instead be controlled separately. If an under-voltage condition for first battery cell 210 in such a system occurs, discharge control transistor 250 for the first battery may be turned off to prevent discharging, though discharge control transistor 280 for second battery cell 220 may remain on. If both battery cells 210 and 220 are then charged, body diode DD1 of discharge control transistor 250 for first battery cell 210 may turn on to approximately 0.7 Volts. This may limit the charge voltage of first battery cell 210 to be a diode drop (0.7 Volts) less than the charge voltage of second battery cell 220. When the under-voltage condition is exited and discharge control transistor 250 for first battery cell 210 is turned on, the control paths would provide a connection between the batteries. That would result in the 0.7 volts being applied across the resistance of the control paths and any parasitic resistances (shown here as RSTRAY) in the connection paths. Since these resistances are typically small, the resulting currents may be large and may damage the battery system circuitry or its interconnect. By connecting the control electrodes of charge control transistors 260 and 290 together, and further connecting the control electrodes of discharge control transistors 250 and 280 together, the likelihood of large voltage differences occurring between battery cells may be reduced.

These and other embodiments of the present invention may further include various types of sensors. These sensors may detect an event or condition and prevent further charging, discharging, or both, of their corresponding battery cell or battery cells. These and other embodiments of the present invention may further include pressure sensors. These pressure sensors may be placed on or near the battery cells or other battery circuit components. These pressure sensors may detect an increase in pressure in a battery cell and prevent further charging, discharging, or both of their corresponding battery. In these and other embodiments of the present invention, the battery controller may allow further charging or discharging once the pressure returns to a normal range, though in other embodiments, the battery controller may instead not allow further charging or discharging even after the pressure returns to a normal range. These and other embodiments of the present invention may include temperature sensors. These temperature sensors may be placed on or near the battery cells or other battery circuit components. These temperature sensors may detect excessive temperatures (either high or low, or both) and prevent further charging, discharging, or both of their corresponding battery. An example is shown in the following figures.

Figure 4:
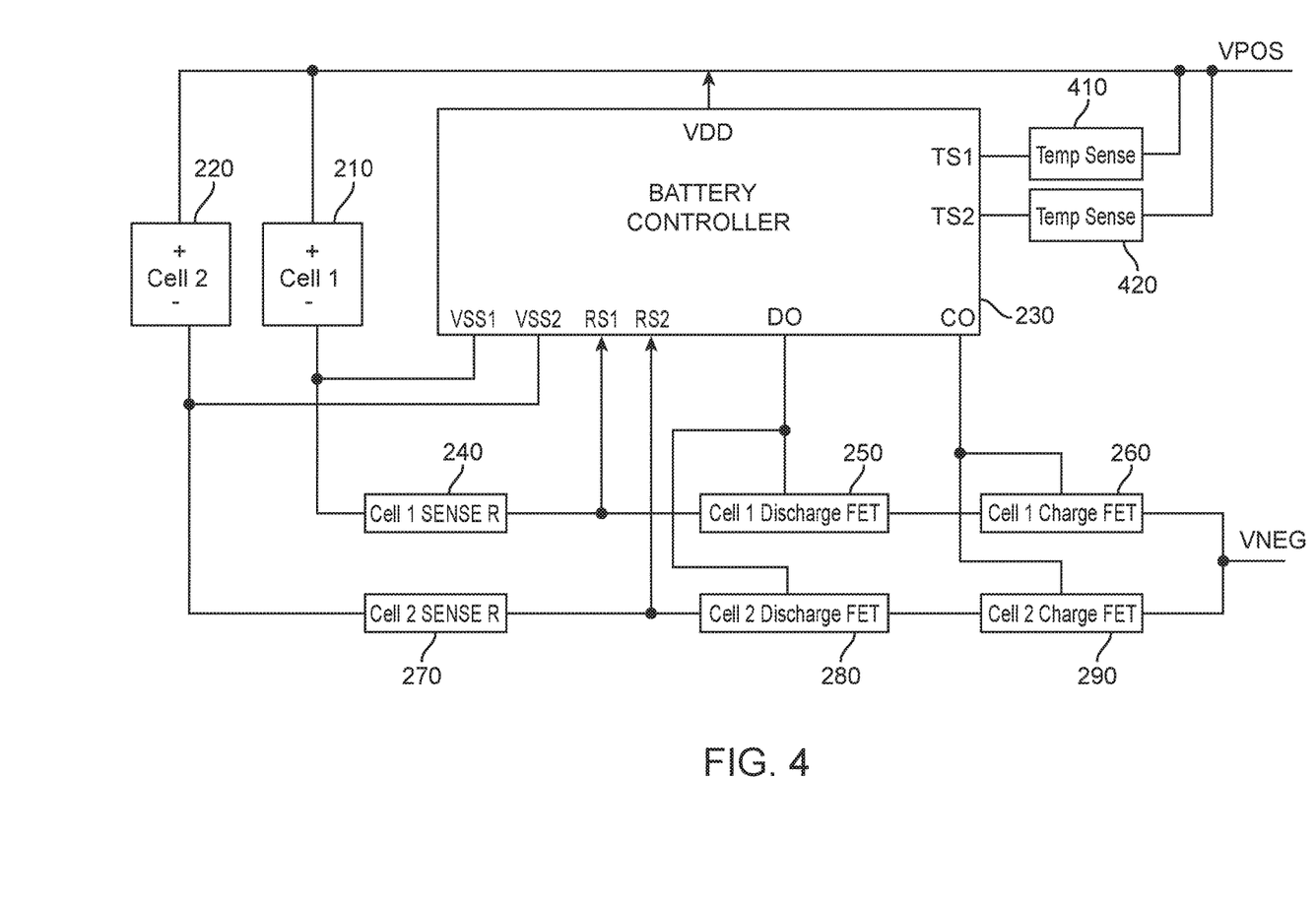
FIG. 4 illustrates a more detailed view of a battery system according to an embodiment of the present invention.

FIG. 4 illustrates a more detailed view of a battery system according to an embodiment of the present invention. Specifically, temperature sensors 410 and are shown. Temperature sensors 410 and 420 may be placed on or near battery cells 210 and 220 or other battery circuit components and connected to battery controller 230. Temperature sensors 410 and 420 may detect excessive temperatures (either high or low, or both) and prevent further charging, discharging, or both, of their corresponding battery cells 210 and 220. More specifically, temperature sensors 410 and 420 may detect excessive temperatures. Temperature sensors 410 or 420 may alert battery controller 230 of this excess temperature reading. Battery controller 230 may then prevent further charging, discharging, or both, of their corresponding battery cells 210 and 220. In these and other embodiments of the present invention, once the temperature returns to a normal range, further charging, discharging, or both, of battery cells 210 and 220 may resume.

Figure 5:
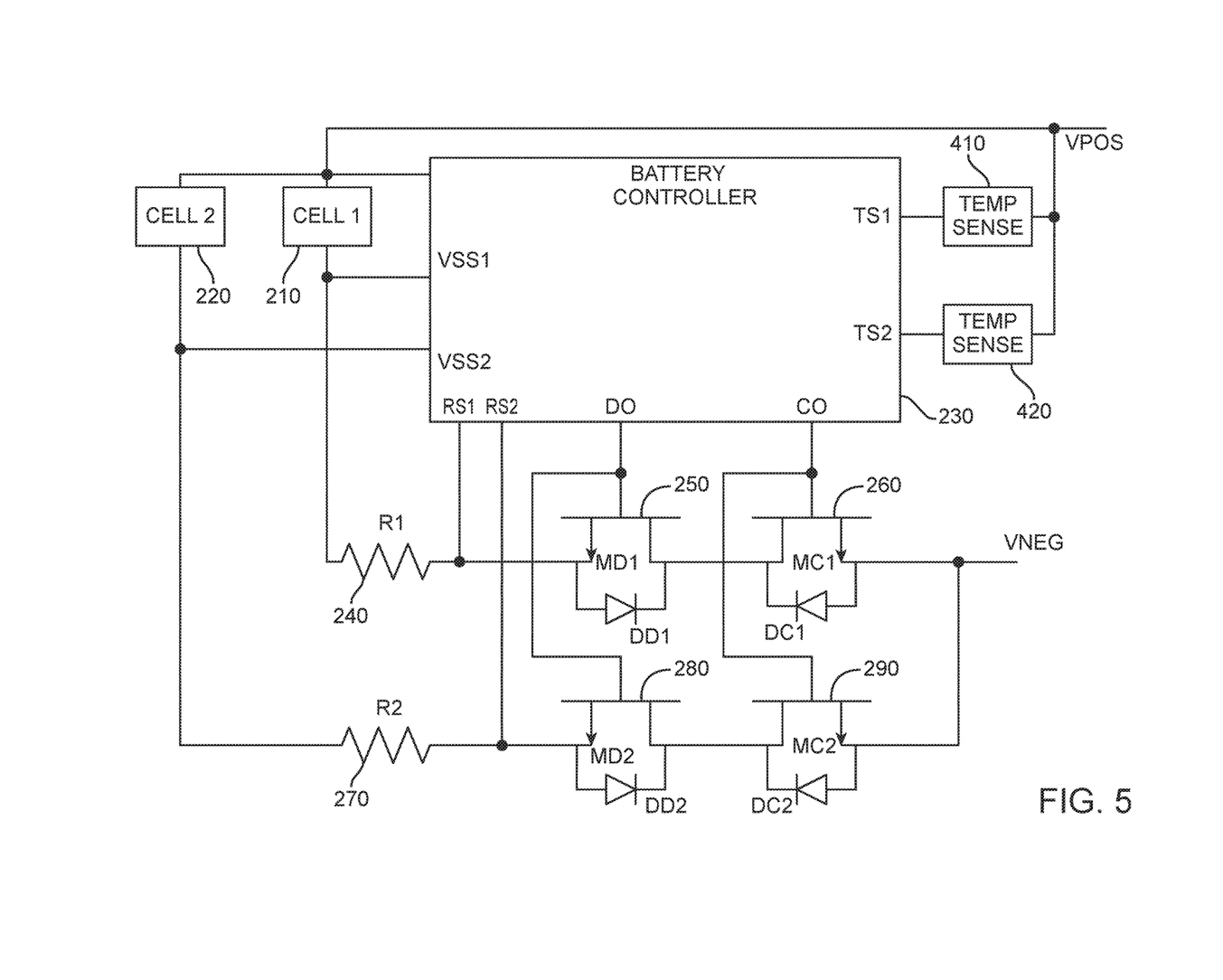
FIG. 5 illustrates a more detailed view of a battery system according to an embodiment of the present invention.

FIG. 5 illustrates a more detailed view of a battery system according to an embodiment of the present invention. In this example, discharge control transistors 250 and 280 are shown in more detail as transistors MD1 and MD2 and their corresponding body diodes DD1 and DD2. Similarly, charge control transistors 260 and 290 are shown in more detail transistors MC1 and MC2 and their corresponding body diodes DC1 and DC2.

Temperature sensors 410 and 420 may be placed on or near battery cells 210 and 220 or other battery circuit components and connected to battery controller 230. Temperature sensors 410 and 420 may detect excessive temperatures. Temperature sensors 410 or 420 may alert battery controller 230 of this excess temperature reading. Battery controller 230 may then prevent further charging, discharging, or both, of their corresponding battery cells 210 and 220. More specifically, battery controller may de-assert control lines DO, CO, or both, thereby turning off discharge control transistors 250 and 280, charge control transistors 260 and 290, or both discharge control transistors 250 and 280 and charge control transistors 260 and 290. Charging, discharging, or both, may resume once the temperature returns to an acceptable range.

As described above, connecting the control electrodes or gates of discharge control transistors 250 and 280 together, and further connecting the control electrodes or gates of charge control transistors 260 and 290 together, may reduce the occurrence of mismatches in voltages between first battery cell 210 and second battery cell 220. Unfortunately, battery cell voltage mismatches may occur in other ways.

For example, in an over-current discharge condition, battery cells may discharge at different rates due to differences in their capacities, thereby leading to a difference in battery cell voltages. Similarly, in an over-current charge condition, battery cells may charge at different rates due to differences in their capacities, thereby leading to a difference in battery cell voltages. As another example, one battery cell may leak more than another when the device is powered off, causing that battery cell to have a comparatively reduced voltage over time. When the device is activated, the battery cells may be connected through the control paths. The difference in battery cell voltages would appear across the control paths, again resulting in large and possibly damaging currents as the cells attempt to rebalance to a common voltage. To avoid this, and to protect the battery system including the battery cells, control paths, and interconnect, embodiments of the present invention may provide a balance switch. The balance switch may provide a low-impedance path between terminals of different battery cells. This balance switch may be located at least partially in battery controller 230. The balance switch may close when either the charge or discharge control transistors are off and a difference between battery cell voltages is above a threshold voltage. That is, the balance switch may close when either the charge or discharge control transistors are off because when they are both on, the control paths provide a low-impedance path between batteries, and the balance switch may close when the difference between battery cell voltages is above a threshold because otherwise there is not enough voltage to cause a problem. An example is shown in the following figure.

Figure 6:
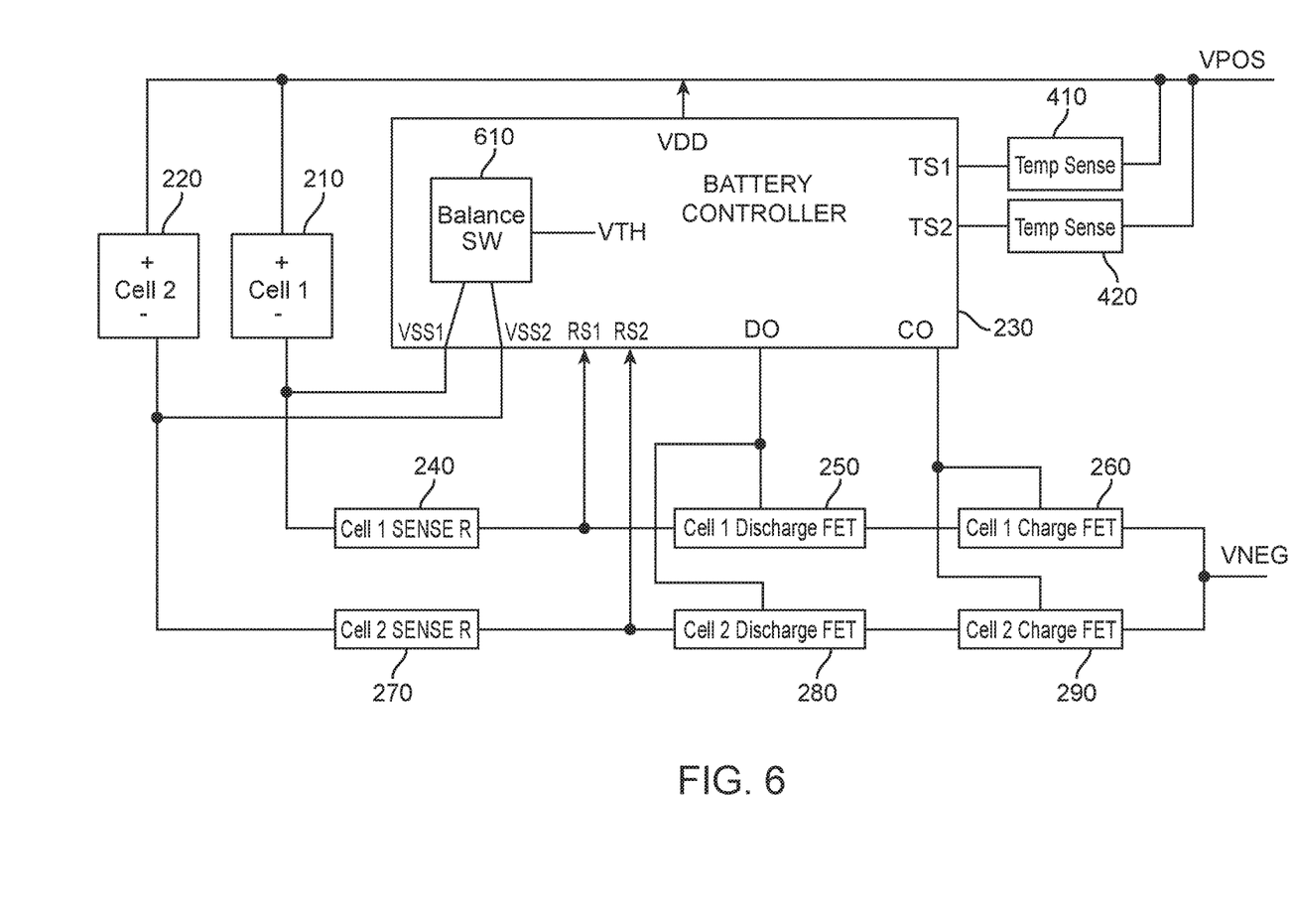
FIG. 6 illustrates a more detailed view of a battery system according to an embodiment of the present invention.

FIG. 6 illustrates a more detailed view of a battery system according to an embodiment of the present invention. In this example, battery controller 230 may include balance switch 610. Positive terminals of first battery cell 210 and second battery cell 220 may be connected together. When balance switch 610 is closed, balance switch 610 may provide a low impedance path between the negative terminals of first battery cell 210 and second battery cell 220. This may effectively connect first and second battery cells 210 and 220 in parallel. This, in turn, may balance their voltages and prevent large currents through their control paths.

Figure 7:
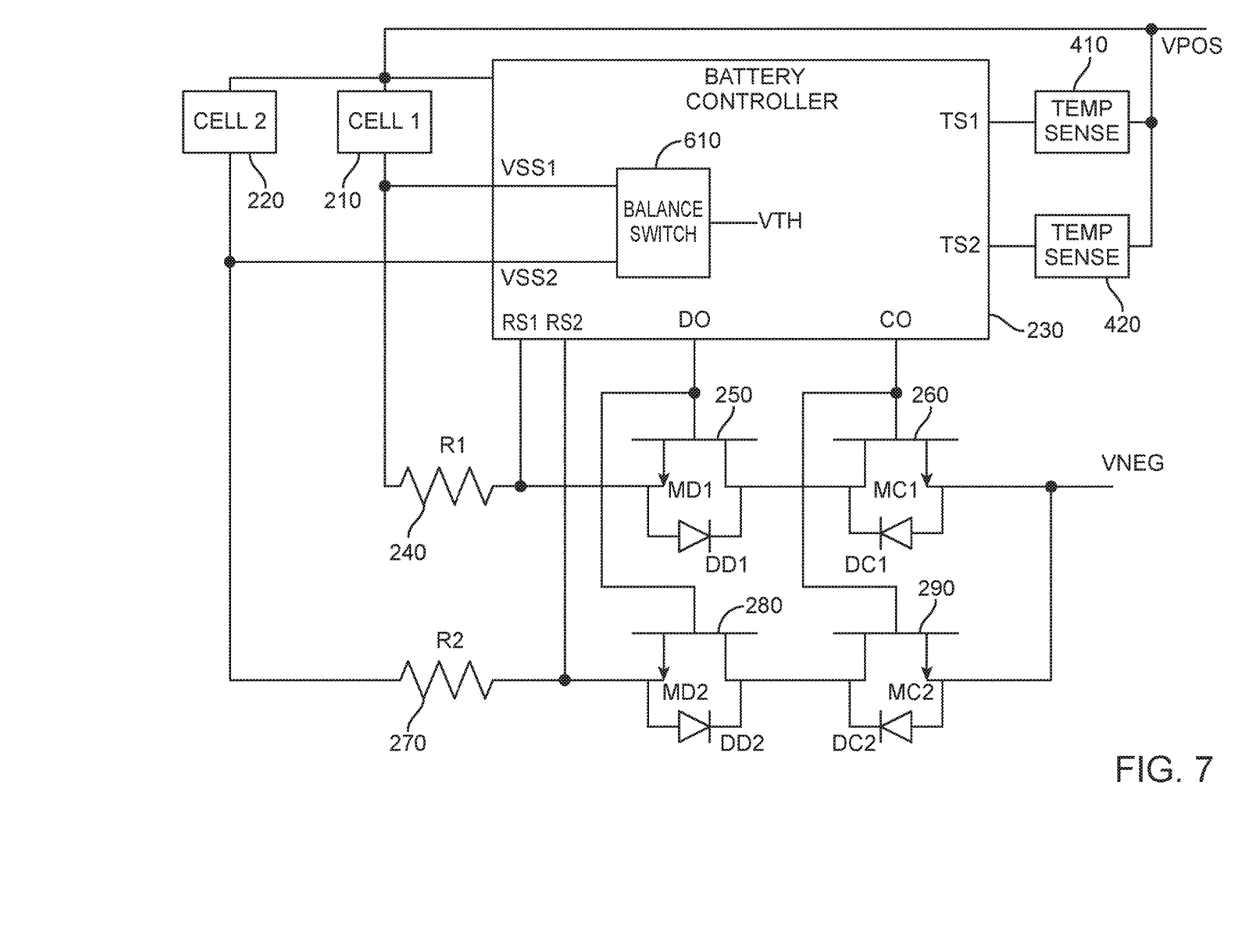
FIG. 7 illustrates a more detailed view of a battery system according to an embodiment of the present invention.

FIG. 7 illustrates a more detailed view of a battery system according to an embodiment of the present invention. In this example, discharge control transistors 250 and 280 are shown in more detail as transistors MD1 and MD2 and their corresponding body diodes DD1 and DD2. Similarly, charge control transistors 260 and 290 are shown in more detail transistors MC1 and MC2 and their corresponding body diodes DC1 and DC2.

In these and other embodiments of the present invention, voltage differences between battery cells 210 and 220 may occur due to a short circuit in one of the battery cells, or other such condition. When a relatively large voltage difference is detected between battery cells 210 and 220, battery controller 230 may shut off charge control transistors 260 and 290 and discharge control transistors 250 and 280 for each of the battery cells 210 and 220. Battery controller 230 may shut off balance switch 610 as well. The voltage difference at which this occurs may be approximately 0.5 Volts, 0.7 Volts, 1.0 Volts, 1.23 Volts, or other appropriate voltage. In these and other embodiments of the present invention, a timer or other circuit or code (not shown) may be used such that voltage transients are ignored and battery controller 230 does not disable the charge and discharge control transistors 250-290 and balance switch 610 unless the required voltage difference is maintained for a first duration.

Unfortunately, this disabling may cause a difficulty during assembly. For example, during assembly, battery cells 210 and 220 may be attached sequentially, such that one battery cell may be attached before another. In this state, battery controller 230 may see a large voltage at the attached battery cell and a low voltage due to the unattached battery cell. This voltage difference may cause battery controller 230 to disable the charge and discharge control transistors 250-290 and balance switch 610. To avoid this, a latch circuit (not shown) may be employed. The latch circuit may be set only after all the battery cells are attached. Until the latch circuit is set, battery controller 230 may ignore large voltage differences between battery cells 210 and 220, such as the difference that may be caused by one battery cell not yet being installed. Once both battery cells 210 and 220 are attached, the latch may be set and battery controller 230 may react to large voltage differences between battery cells 210 and 220 by disabling the charge and discharge control transistors 250-290 and balance switch 610. The latch may be cleared by various conditions, such as the battery cells returning to approximately the same voltage, or when a battery cell is replaced. This latch circuit may be implemented in hardware, software, or a combination thereof. This latch circuit may be at least partially implemented in battery controller 230 or elsewhere in the system.

In these and other embodiments of the present invention, the balance switch may include a switch that includes a transistor, a series of two or more transistors, parallel transistors of different types (for example, one N-channel and one P-channel transistor), a relay, a microelectromechanical switch, or other type of switch. The switch may be formed on an integrated circuit with the battery controller, or it may be located off a chip on which the battery controller is formed. The switch may be driven by various types of circuitry. For example, the switch may be driven by a window comparator that determines whether an absolute value of a difference between battery cell voltages is above a first voltage threshold. The window comparator may be enabled by a gate that determines that either charging or discharging has been disabled. An example is shown in the following figure.

Figure 8:
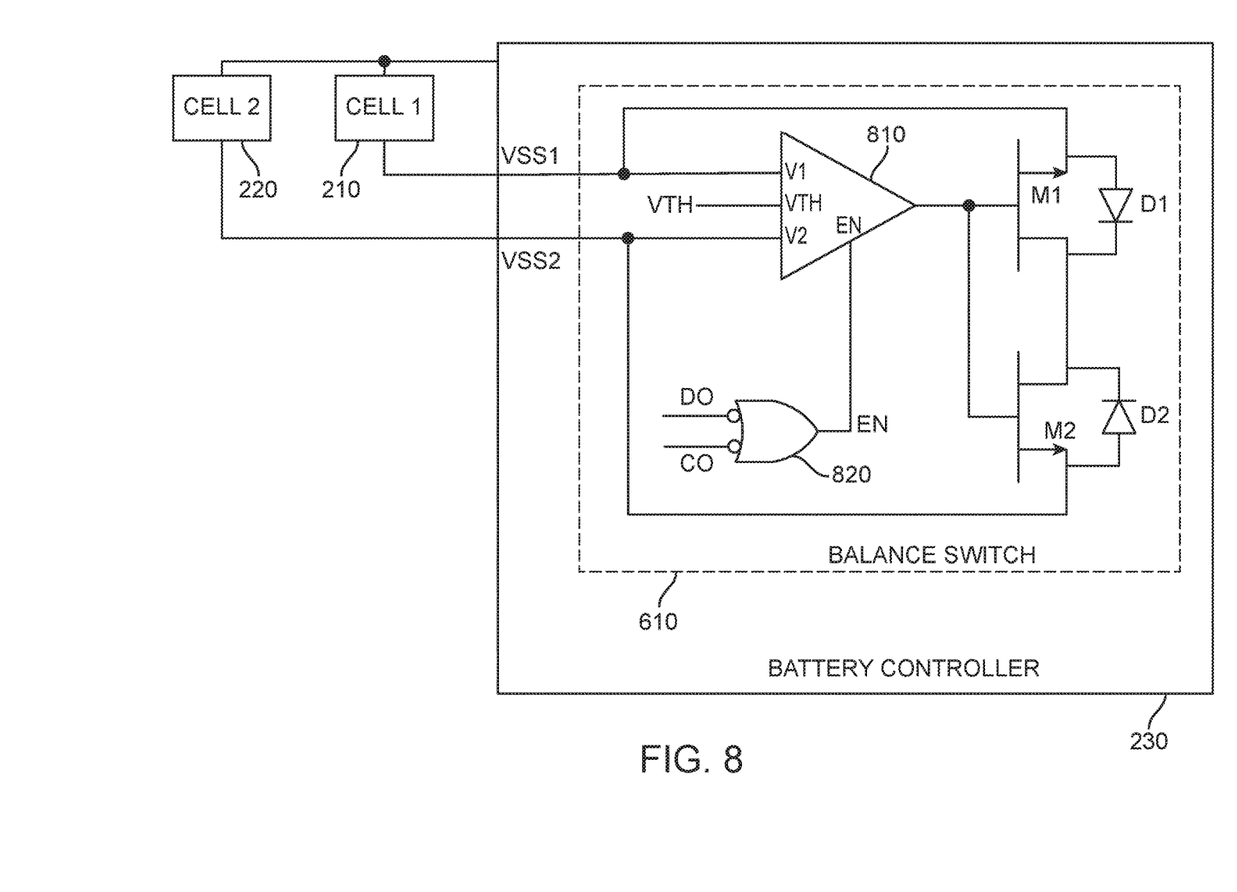
FIG. 8 illustrates a balance switch according to an embodiment of the present invention.

FIG. 8 illustrates a balance switch according to an embodiment of the present invention. In this example, a low impedance path may be provided by switch transistors M1 and M2 in balance switch 610. These switch transistors may be located on battery controller 230, or they may be located off of an integrated circuit that houses some or all of battery controller 230.

More specifically, a terminal of first battery cell 210 may be connected to a source of transistor M1 via battery controller input VSS1. A drain of transistor M1 may connect to a drain of transistor M2. A source of transistor M2 may connect to a terminal of second battery cell 220 via battery controller input VSS2. The control electrodes or gates of transistors M1 and M2 may be driven by window comparator 810. Window comparator 810 may provide a high output when an absolute value of a difference between the voltages of first battery cell 210 and second battery cell 220 exceeds a threshold voltage received by window comparator 810 at a VTH input. Window comparator 810 may be enabled by OR gate 820. OR gate 820 may enable window comparator 810 when either one of the discharge output or control output pans of battery controller 230 are de-asserted. That is, when battery controller 230 de-asserts either its DO output to disable the discharge control transistors or its CO output to disable the charge control transistors, OR gate 820 enables window comparator 810. Again, when window comparator 810 detects that a voltage difference at its inputs VSS1 and VSS1 is above the threshold voltage, window comparator 810 may turn on switch transistors M1 and M2, thereby providing a low impedance path between terminals of first battery cell 210 and second battery cell 220.

Again, while the balance switch transistors are shown here as two series transistors M1 and M2, in these and other embodiments of the present invention, transistors M1 and M2 may be replaced by a single transistor, a parallel combination of multiple transistors such as a P-channel and N-channel connected in parallel. Also, while transistors M1 and M2 are shown as being N-channel transistors, in these and other embodiments of the present invention, P channel transistors may be used with appropriate changes to logic levels in balance switch 610. In these and other embodiments of the present invention, other types of transistors, such as bipolar transistors, may be used.

In the above examples, battery systems having two battery cells have been shown. In these and other embodiments of the present invention, battery systems may include three, four, or more than four battery cells. Each of these battery cells may be controlled by a control path that may be the same or similar to the control paths shown in the above examples. The control electrodes or gates of the discharge control transistors in each of these control paths may be connected together. Similarly, the control electrodes or gates of the charge control transistors in each of these control paths may be connected together.

In the above examples, charge control transistors and discharge control transistors are shown as N-channel field effect transistors. In these and other embodiments of the present invention, one or more of these charge and discharge control transistors may be implemented as P-channel field effect transistors. Also, while their body diodes are shown, in these and other embodiments of the present invention, the body diodes may be replaced by actual diodes. These diodes may be P-N diodes, they may be Schottky diodes, or they may be other types of diodes. These diodes and transistors may be at least partially formed on an integrated circuit that also forms at least part of a battery controller, or they may be separate components.

In these examples, the control paths including sense resistors, discharge control transistors, and charge control transistors, are connected between a negative terminal of a battery cell and a negative terminal of a battery system. In these and other embodiments of the present invention, one or more control paths may be connected between a positive terminal of a battery cell and a positive terminal of a battery system. Also, while components in the control paths, specifically the sense resistors, discharge control transistors, and charge control transistors, are shown as being connected in a specific sequence, these components may be connected in different sequences in one or more of the control paths.

Embodiments of the present invention may provide battery systems that may be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, remote control devices, chargers, and other devices that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A battery system comprising:
    a first battery cell having a first terminal and a second terminal;
    a second battery cell having a first terminal and a second terminal, the first terminal of the second battery cell coupled to the first terminal of the first battery cell;
    a battery controller;
    a first control path coupled between the second terminal of the first battery cell and a first terminal of the battery system, the first control path comprising:
        a first sense resistor;
        a first discharge control transistor; and
        a first charge control transistor; and
    a second control path coupled between the second terminal of the second battery cell and the first terminal of the battery system, the second control path comprising:
        a second sense resistor;
        a second discharge control transistor; and
        a second charge control transistor,
    where a control electrode of the first discharge control transistor is coupled to a control electrode of the second discharge control transistor and to a discharge control output of the battery controller, and
    where a control electrode of the first charge control transistor is coupled to a control electrode of the second charge control transistor and to a charge control output of the battery controller.

2. The battery system of claim 1 wherein the first battery cell and the second battery cell have different form factors.

3. The battery system of claim 1 wherein the first battery cell and the second battery cell have different capacities.

4. The battery system of claim 1 wherein the first battery cell and the second battery cell have different form factors and different capacities.

5. The battery system of claim 2 wherein the first discharge control transistor, the second discharge control transistor, the first charge control transistor, and the second charge control transistor are N-channel field-effect transistors.

6. The battery system of claim 2 wherein the first discharge control transistor, the second discharge control transistor, the first charge control transistor, and the second charge control transistor are P-channel field-effect transistors.

7. The battery system of claim 2 wherein the first control path is coupled between the second terminal of the first battery cell and a negative terminal of the battery system and the second control path is coupled between the second terminal of the second battery cell and the negative terminal of the battery system.

8. The battery system of claim 2 further comprising a first temperature sensor near the first battery cell and a second temperature sensor near the second battery cell, wherein the first temperature sensor and the second temperature sensor are coupled to the battery controller.

9. The battery system of claim 8 wherein responsive to either the first temperature sensor or the second temperature sensor detecting a temperature above a temperature threshold, the battery controller prevents charging of the first battery cell and the second battery cell.

10. The battery system of claim 2 further comprising a balance switch to provide a low impedance path from the second terminal of the first battery cell to the second terminal of the second battery cell in response to either the first discharge control transistor and the second discharge control transistor or the first charge control transistor and the second charge control transistor being off and an absolute value of a voltage difference between the first battery cell and the second battery cell being greater than a first threshold voltage.

11. The battery system of claim 10 wherein the balance switch comprises a transistor coupled between the second terminal of the first battery cell and the second terminal of the second battery cell.

12. The battery system of claim 10 wherein the balance switch comprises a series combination of a first transistor and a second transistor coupled between the second terminal of the first battery cell and the second terminal of the second battery cell.

13. The battery system of claim 12 further comprising a window comparator having a first input coupled to the second terminal of the first battery cell, a second input coupled to the second terminal of the second battery cell, and a third input coupled to receive the first threshold voltage.

14. The battery system of claim 13 wherein the series combination of a first transistor and a second transistor is formed on an integrated circuit with the battery controller.

15. The battery system of claim 13 wherein the series combination of a first transistor and a second transistor is located off an integrated circuit comprising the battery controller.

16. The battery system of claim 12 wherein the series combination of a first transistor and a second transistor is located off an integrated circuit comprising the battery controller.

17. The battery system of claim 2 wherein a body diode of the first charge control transistor provides a discharge path for the first battery cell when the first charge control transistor is off.

18. A battery system comprising:
a first battery cell having a first terminal and a second terminal;
a second battery cell having a first terminal and a second terminal, the first terminal of the second battery cell coupled to the first terminal of the first battery cell; and
a battery controller comprising:
a balance switch to provide a low impedance path from the second terminal of the first battery cell to the second terminal of the second battery cell in response to either a first discharge control transistor and a second discharge control transistor or a first charge control transistor and a second charge control transistor being off and an absolute value of a voltage difference between the first battery cell and the second battery cell being greater than a first voltage threshold.

19. The battery system of claim 18 wherein the first battery cell and the second battery cell have different capacities and different form factors.

20. The battery system of claim 19 wherein the balance switch comprises a series combination of a first transistor and a second transistor coupled between the second terminal of the first battery cell and the second terminal of the second battery cell.

* * * * *